(12) United States Patent
Kumar et al.

(10) Patent No.: US 9,053,729 B1
(45) Date of Patent: Jun. 9, 2015

(54) NONLINEARITY-BASED CONTACT PREDICTION

(71) Applicant: SEAGATE TECHNOLOGY LLC, Cupertino, CA (US)

(72) Inventors: Vijay Kumar, Edina, MN (US); Ravishankar A. Shivarama, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/338,485

(22) Filed: Jul. 23, 2014

(51) Int. Cl.
*G11B 21/02* (2006.01)
*G11B 27/36* (2006.01)
*G11B 5/60* (2006.01)
*G11B 5/54* (2006.01)

(52) U.S. Cl.
CPC ............ *G11B 5/6011* (2013.01); *G11B 5/6076* (2013.01); *G11B 5/54* (2013.01); *G11B 5/6058* (2013.01); *G11B 5/607* (2013.01)

(58) Field of Classification Search
None
See application file for complete search history.

(56) References Cited

U.S. PATENT DOCUMENTS

| 6,069,771 | A | 5/2000 | Boutaghou |
| 6,493,177 | B1 | 12/2002 | Ell |
| 6,751,047 | B2 | 6/2004 | Bonin |
| 7,038,875 | B2 | 5/2006 | Lou |
| 7,508,617 | B1 | 3/2009 | Mak |
| 7,948,704 | B2 | 5/2011 | Ellis |
| 8,325,432 | B2 | 12/2012 | Mathew |
| 8,804,275 | B1 * | 8/2014 | Mate ............................... 360/75 |
| 2012/0087035 | A1 | 4/2012 | Graef |
| 2012/0218659 | A1 | 8/2012 | Liu |

FOREIGN PATENT DOCUMENTS

EP          1 526 515          7/2008

* cited by examiner

*Primary Examiner* — Andrew L Sniezek
(74) *Attorney, Agent, or Firm* — Mueting, Raasch & Gebhardt, P.A.

(57) ABSTRACT

Various embodiments of a method of detecting a contact event between a head and a storage medium, and a storage device that utilizes such method are disclosed. In one or more embodiments, the method includes applying an input signal to an actuator of a head of a storage device; identifying a frequency of the input signal; detecting an output signal in response to the input signal; and detecting a contact event between the head and a storage medium of the storage device if the output signal includes an even harmonic frequency and an odd harmonic frequency of the frequency of the input signal.

20 Claims, 7 Drawing Sheets

US 9,053,729 B1

NONLINEARITY-BASED CONTACT PREDICTION

SUMMARY

In general, the present disclosure provides various embodiments of a storage device and methods of using such storage device.

In one aspect, the present disclosure provides a method that includes applying an input signal to an actuator of a head of a storage device; identifying a frequency of the input signal; detecting an output signal in response to the input signal; and detecting a contact event between the head and a storage medium of the storage device if the output signal includes an even harmonic frequency and an odd harmonic frequency of the frequency of the input signal.

In another aspect, the present disclosure provides a storage device that includes an actuator configured to actuate a head of the storage device and receive an input signal, and a controller. The controller is configured to identify a frequency of the input signal; detect an output signal in response to the input signal; and reconfigure the storage device if the output signal includes an even harmonic frequency of the frequency and an odd harmonic frequency of the frequency of the input signal.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
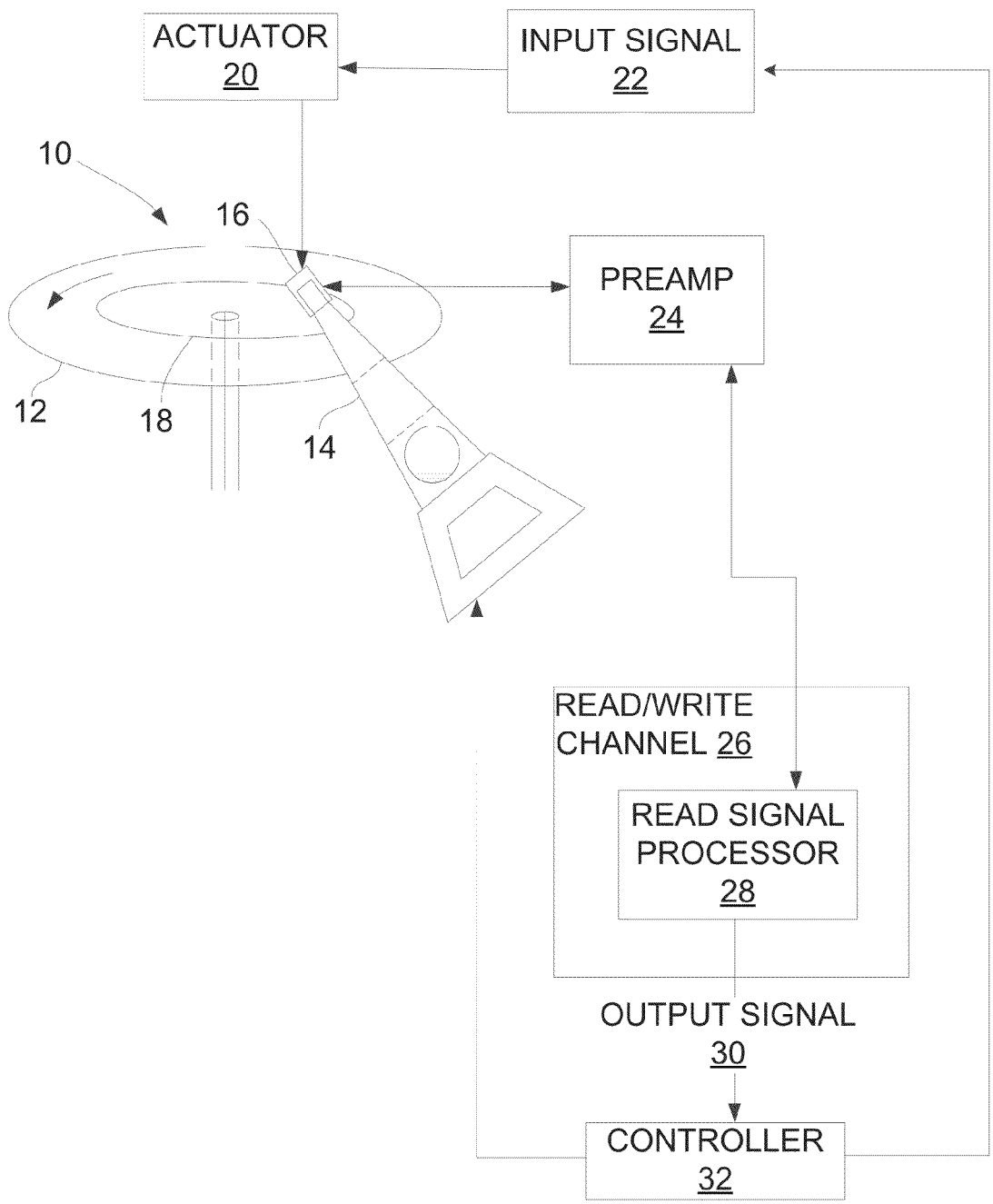
FIG. 1 is a schematic flow diagram of one embodiment of a storage device.

In general, the present disclosure provides various embodiments of a head-to-media contact detection technique and a storage device that utilizes such technique when the device is being calibrated or is in use in the field. In one or more embodiments, a contact detection technique includes applying an input signal to an actuator of a head of a storage device, identifying a frequency of the input signal, detecting an output signal in response to the input signal, and detecting a contact event between the head and a storage medium of the storage device if the output signal includes one or more harmonic frequencies of the frequency of the input signal. As used herein, the term "contact event" refers to an event when a head of a storage device physically contacts a storage medium of the storage device, or when physical contact between the head and the storage medium is likely to occur, i.e., given the conditions present in the storage device, contact between the head and the storage medium is likely to occur.

Two exemplary types of contact detection techniques used in data storage device calibration include detecting modulation when a head and storage medium of the storage device contact and detecting the off-track signal measured by a change in a position error signal (dPES) caused by friction when contact of the head against the media is made at a non-zero skew angle. Position error signal (PES) is a signal that indicates the radial position of a transducing head with respect to the tracks on a rotatable storage medium. In high performance data storage devices, the PES is derived from either a prerecorded servo disc with a corresponding servo head (i.e., a dedicated servo system), or from servo information that is embedded on each recording surface among user data blocks at predetermined intervals (i.e., an embedded servo system). The head provides the servo information to servo control circuitry, which generates the PES with a magnitude that is typically equal to zero when the head is positioned over the center of the track ("on track"), and is linearly proportional to a relative off-track distance between the head and the center of the track.

Detecting contact using modulation, such as by Integrated Peak Detection (IPD), can be more sensitive than detecting contact using the dPES technique if the interface of the head and media has a large enough contact modulation. If, on the other hand, the interface of the head and media has low modulation, the dPES signal may be the only signal available for detecting contact. In addition, detecting contact of the head and the media with the dPES signal can be difficult because the dPES signal can include noise from many different sources, such as from Repeatable Run Out (RRO), Non-Repeatable Run Out (NRRO), FOS heating (i.e., the heating of the flexible cable on the suspension which supports the head), and windage in the data storage device.

The interface between the head and media is under constant study and developments have been made that continue to decrease the head-to-media spacing for higher areal density media. One potential feature of these developments is a low modulation at contact. Such an interface makes it more difficult to detect a head-to-media contact using modulation.

Some storage devices include microactuators for improved servo-mechanical performance. For example, storage devices that utilize dual-stage actuation can include both a voice coil motor (VCM) and a head microactuator for tracking purposes. The head level micro-actuator can also be used during other conditions like servo-fault, buzz conditions, factory bode sweeps etc.

For example, FIG. 1 is a simplified block diagram of a storage device 10 that includes a head actuator or micro-actuator 20. Storage device 10 also includes a storage medium 12, a suspension 14, and a transducing head 16 supported by the suspension that can read and write data to a track 18 on the medium. Although the storage medium 12 is illustrated as being a rotatable disc, any suitable storage medium can be utilized in storage device 10. Storage device 10 can also include a preamplifier (preamp) 24 for generating a write signal that is applied to head 16 during a write operation, and for amplifying a read signal provided by the head during a read operation.

A read/write channel 26 can be coupled to the head 16. The channel 26 can receive user data during a write operation and process a read signal magnified by preamp 24 with a read signal processor 28. Besides obtaining, detecting, and decoding user data recorded on storage medium 12 in the form of a read signal, read signal processor 28 can also obtain and detect a position error signal (PES) that indicates a distance that the transducing head is off-track. The read signal that indicates user data or off-track data is considered to be the output signal 30 as illustrated in FIG. 1. The output signal 30 is received by controller 32. Controller 32 includes a processor and can be configured to detect a contact event between transducing head 16 and storage medium 12 as is further described herein.

Head 16 can also include the actuator 20, such as a heater, for moving a transducing element, such as a read element or write element, closer to or away from storage medium 12. In one or more embodiments, an input signal 22 can be provided to the actuator 20. Any suitable input signal 22 can be provided. For example, in one or more embodiments, the input signal 22 can include an AC signal.

Figure 5:
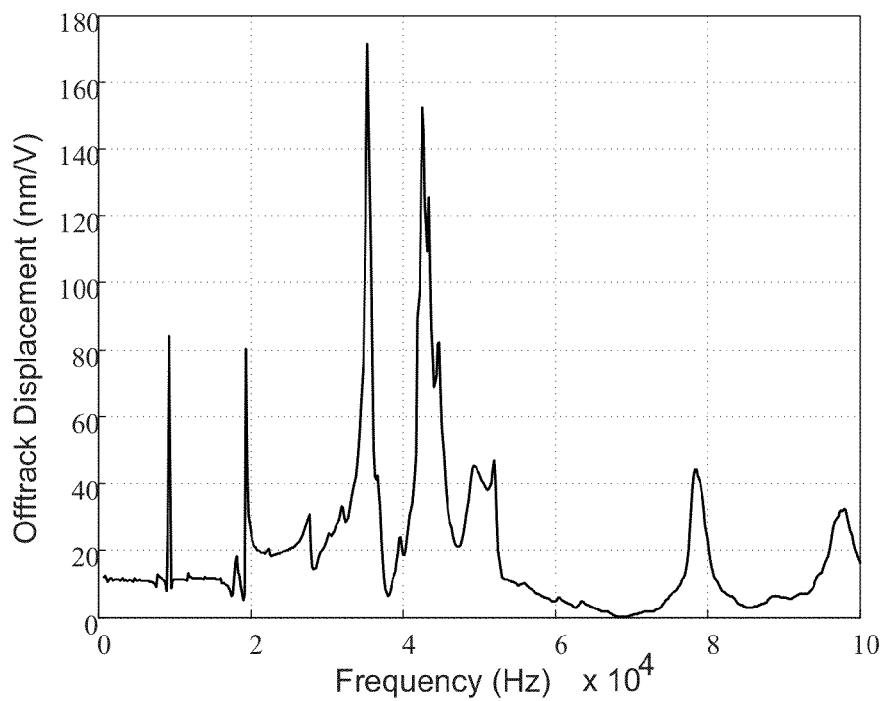
FIG. 5 is a graph of off-track displacement of a head of a storage device versus frequency of an input signal provided to an actuator of the storage device.
Figure 6:
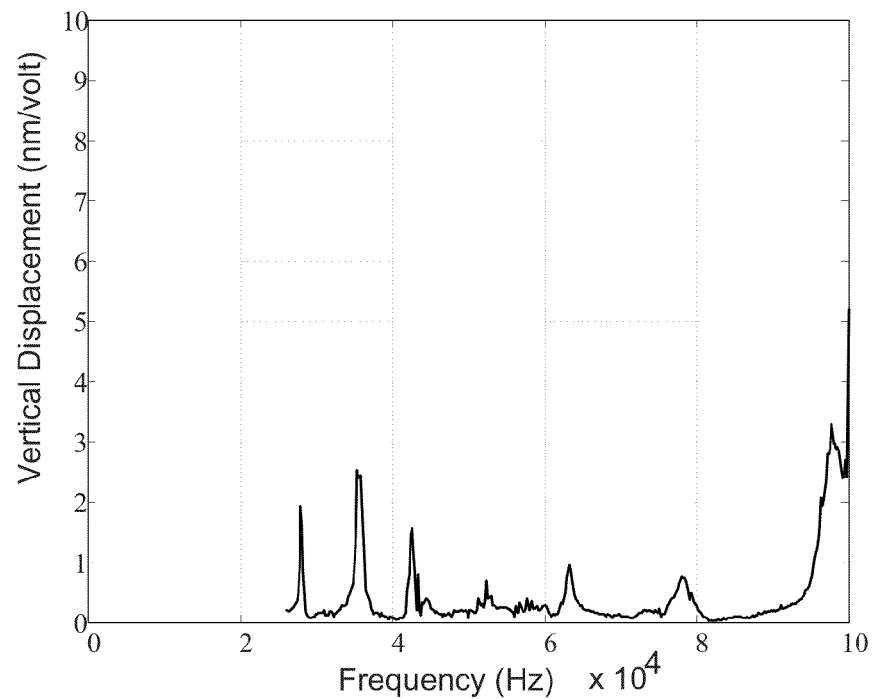
FIG. 6 is a graph of vertical displacement of a suspension of the storage device of FIG. 5 versus frequency of an input signal provided to the actuator of the storage device.

Voltage input to the actuator 20, however, can cause the head 16 to be displaced in one or both of the offtrack and vertical directions. For example, FIGS. 5-6 are graphs that illustrate a representative frequency response of a typical microactuator suspension. The frequency responses were measured on a spin stand using Laser Doppler Vibrometers (LDV). FIG. 5 illustrates offtrack displacement (nm/V) of the head at the trailing edge of the slider versus frequency (Hz) of an input signal provided to the actuator, and FIG. 6 illustrates the vertical displacement of the suspension measured at the trailing edge center (the transducer region) of the head versus frequency of the input signal provided to the actuator. Peaks of the curves indicate system resonance modes (i.e., eigen values).

As can be seen in FIGS. 5-6, the system resonance modes can contribute to both offtrack and vertical response. And such changes in the vertical direction can in some circumstances lead to a change in one or both of a clearance distance between the head and the storage medium or modulation of the head.

In one or more embodiments, the contact detection techniques of the present disclosure can be utilized to identify mean clearance loss versus increased modulation caused by such microactuator input at different driving conditions.

Figure 7:
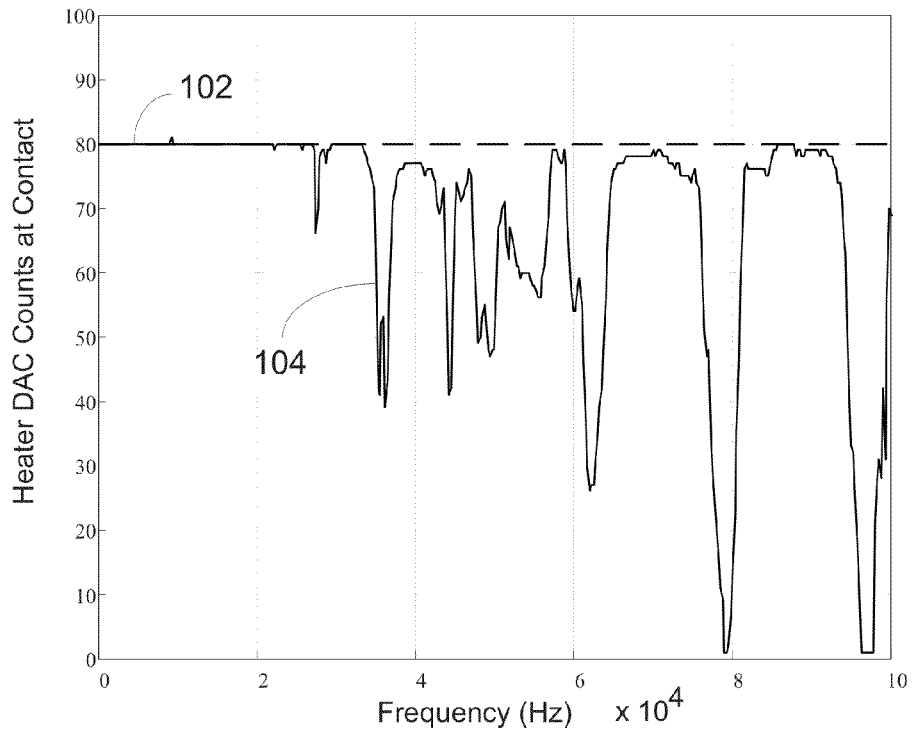
FIG. 7 is a graph of heater DAC counts at contact of a write element heater of a head of a storage device versus frequency both before and during application of an input signal to an actuator of the head.

For example, FIG. 7 is a graph that illustrates the results from an experiment at the drive level, where the effect of microactuator input on clearance loss is indicated. Curve 102 shows a digital to analog converter (DAC) level of a write element heater of a head with no input signal provided to an actuator of the head, i.e., a single stage setting. Curve 104 shows DAC level for the write element heater input when the actuator was driven with a 1V input at each frequency shown. This graph illustrates that at certain resonance frequencies of a suspension that is attached to the head and supports the head, the write element heater requires a lower DAC level input for contact, which can, in one or more embodiments, imply that there is a net clearance loss between the head and the storage medium at such frequencies either through a mean shift in clearance (i.e., fly height) or a modulation of the head at those frequencies.

Figure 8:
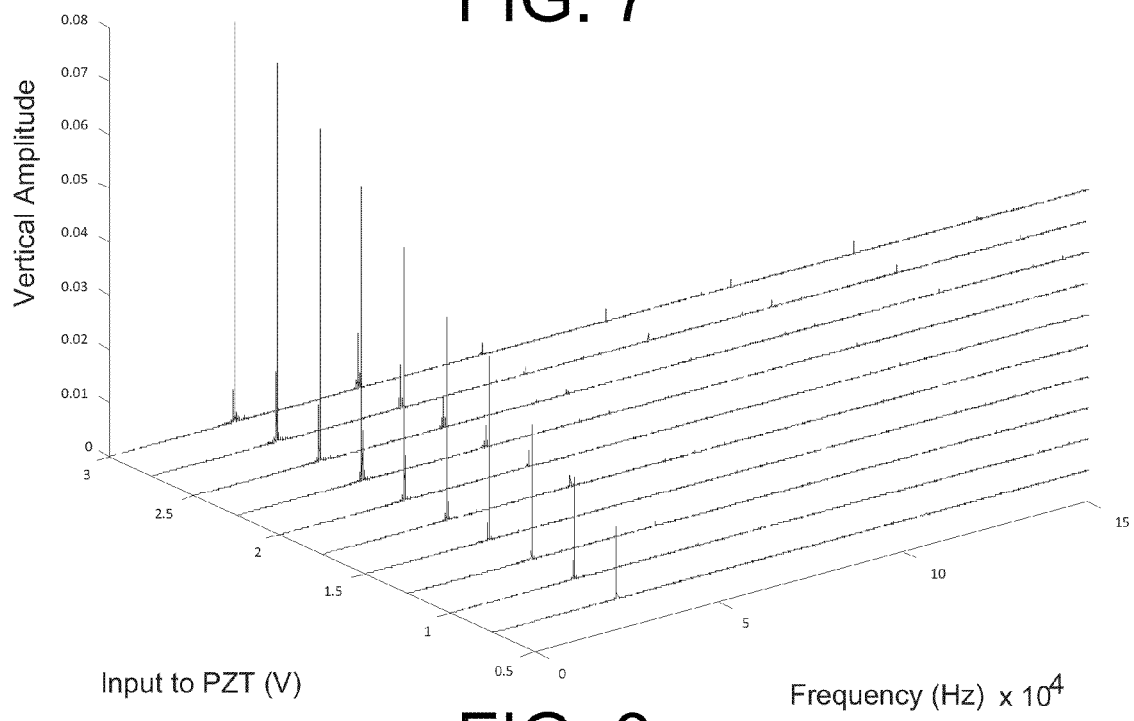
FIG. 8 is a graph of vertical response at a transducer region of a microactuator suspension with input at one of the resonant modes of a suspension of a storage device versus frequency of an output signal for several voltages of the input signal.

The dynamics of the suspension of the storage device can also be observed at various input signal frequencies as a function of input voltage. For example, FIG. 8 is a graph of a vertical response at a transducer region of a microactuator suspension with an air bearing at one of the resonance modes of the suspension as a function of actuator driving voltage. Both heaters of the head (i.e., the write element heater and the read element heater) are set at passive driving conditions, i.e., both heaters are turned off. The microactuator is driven at a constant frequency of 33.6 kHz while sweeping a magnitude of the voltage in increments of 0.25V in a range of 0-3V. The time history at each of the voltage steps is then analyzed for its frequency components. The responses were obtained from an LDV at a component-level test stand. The graph illustrates that the primary mode or fundamental frequency in the output signal has the same frequency as the frequency of the input signal provided to the microactuator. As the input voltage is increased, the vertical response of the suspension exhibits a presence of higher order frequency content, (e.g., 2 times the input frequency and 3 times the input frequency). The presence of harmonic signal content can, in one or more embodiments, indicate a stiffening of the air bearing, which can indicate contact or modulation of the head at clearance levels close to contact.

Figure 9:
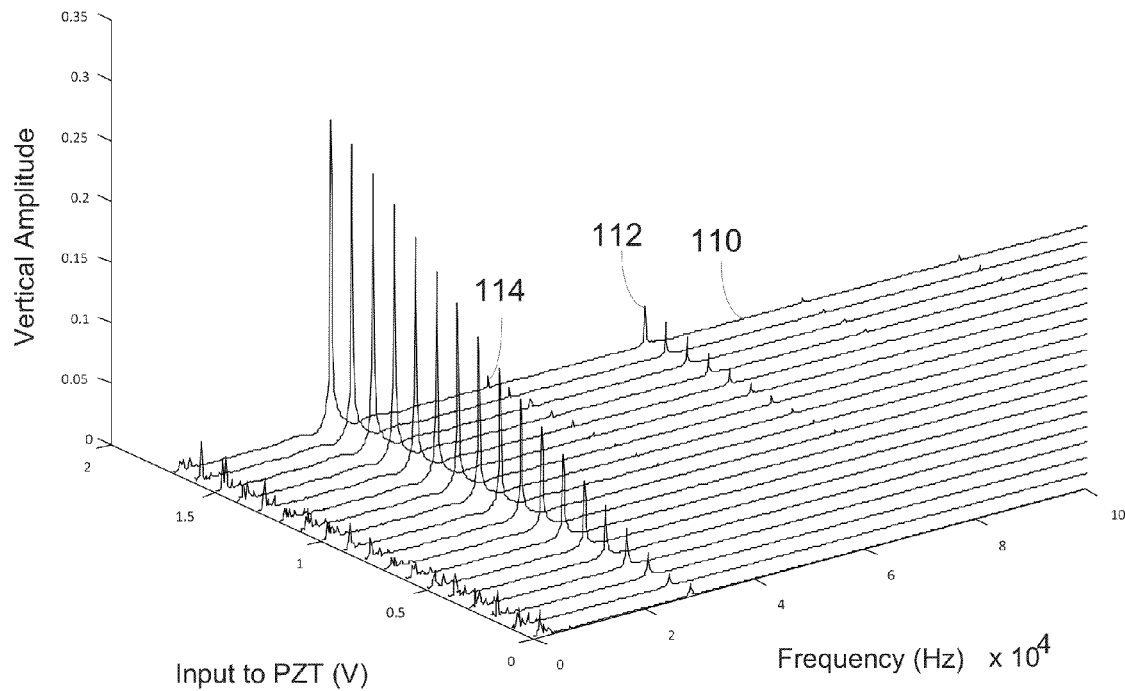
FIG. 9 is a graph of vertical response at a transducer region of a microactuator suspension for an input signal of 28.5 KHz versus frequency of an input signal for several voltages of the input signal.
Figure 10:
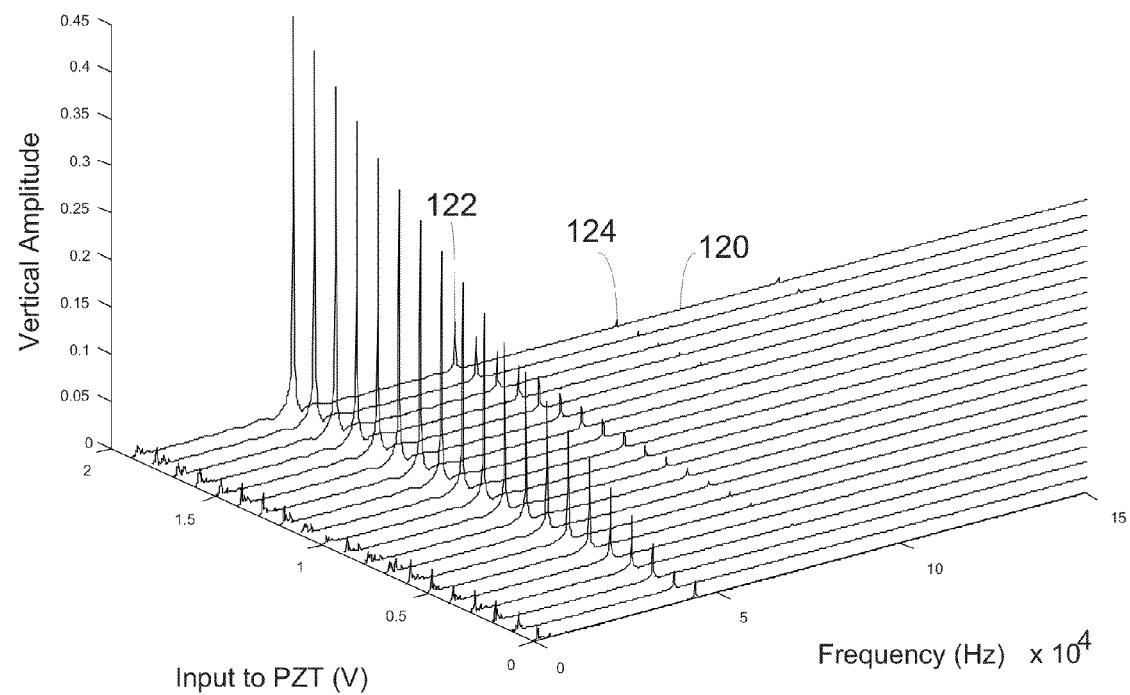
FIG. 10 is a graph of vertical response at a transducer region of a microactuator suspension for an input signal of 44 KHz versus frequency of an output signal for several voltages of the input signal.

FIGS. 9-10 illustrate results from experiments similar to those illustrated in FIG. 8 at drive level on a microactuator suspension. The suspension was driven with microactuator input under passive heater conditions. A frequency of an input signal provided to the microactuator was chosen to match resonance frequencies of the suspension. For example, in FIG. 9, a 28.5 kHz input signal was utilized, and in FIG. 10, a 44 kHz frequency input signal was utilized. The input voltage levels were increased until contact was declared (DETCR techniques were used to detect contact as is further described, e.g., in U.S. Patent Publication No. 2012/0120519 to Kunkel et al. entitled RESISTANCE TEMPERATURE SENSORS FOR HEAD-MEDIA AND ASPERITY DETECTION). A vertical response was measured at the transducer region using a single point LDV. These graphs illustrate that microactuator inputs can cause contact even under passive heater conditions. For an input signal having a frequency of 28.5 kHz, contact was declared at 1.7 V input to the microactuator (curve 110), and for an input signal having a frequency of 44 kHz, contact was declared at 1.9 V input to the microactuator (curve 120). The responses at higher input voltage levels show the presence of higher order harmonic resonance peaks (i.e., 2 times the input signal frequency and 3 times the input signal frequency).

The frequency content of the responses illustrated in FIGS. 8-10 may indicate that the dominant response is at the frequency of the input signal (i.e., the fundamental frequency). The responses, however, may also indicate the presence of higher order resonances or harmonic frequencies (e.g., 2 times the input signal frequency and 3 times the input signal frequency) at input levels closer to contact. These plots also indicate that the higher order resonance peaks appear even before contact was declared using standard detection techniques. Such higher order resonances appear before contact between the head and storage medium occurs and, therefore, can be used to predict a contact event prior to contact taking place.

Once again, while not wishing to be bound by any particular theory, the presence of higher order harmonic frequencies at higher input levels may be used as indicators of a contact event before actual contact between the head and the storage medium occurs. That is, while monitoring the vertical response of the head for any input signal provided to the head, e.g., input signals provided to the actuator of a head, if responses at, e.g., both two and three times the frequency of the input signal are detected in the output signal, then the head may be positioned in close relationship to the storage medium and contact may be imminent, i.e., given the conditions present in the storage device, contact between the head and the storage medium is likely to occur. Further, detecting the characteristics of these nonlinear harmonic frequencies may also indicate the type of clearance loss that has been caused by an input signal to the head. For example, in FIG. 9, a third harmonic peak 112 of curve 110 exhibited a greater amplitude than an amplitude of a second harmonic peak 114. While in FIG. 10, an amplitude of a second harmonic peak 122 of curve 120 was greater than an amplitude of a third harmonic peak 124. As used herein, the term "amplitude" in regard to a frequency curve refers to the vertical displacement of the head of the storage device relative to the storage medium. The presence of a second order nonlinearity (e.g., the second harmonic frequency) can, in one or more embodiments, indicate a DC shift in response with respect to a mean of the original input signal.

In general, the presence of an even harmonic frequency and an odd harmonic frequency of the frequency of the input signal can indicate a contact event. For example, in one or more embodiments, the presence of the second harmonic frequency and the third harmonic frequency of the frequency of the input signal can indicate a contact event.

For example, in one or more embodiments, if the amplitude of the second harmonic frequency is greater than the amplitude of the third harmonic frequency, then the output signal can indicate a mean shift in a fly height. Under standard operating conditions, the head would be operating at a certain average distance from the media. The mean shift in fly height is a change in this average distance. That is, there may be a mean fly height shift in addition to a modulation of the head at that particular frequency. Further, if the amplitude, e.g., of the third harmonic frequency is greater than the amplitude, e.g., of the second harmonic frequency, then the output signal may indicate a greater modulation of the head with respect to the passive fly height level and that there is no mean fly height change. In one or more embodiments, an actual contact event would exhibit an increased modulation and a mean shift in fly height; therefore, both the second harmonic frequency and third harmonic frequency, for example, may be present in the output signal.

In one or more embodiments, identifying the presence of frequencies in the output signal that are harmonics of a frequency of the input signal can be utilized, e.g., for real time contact detection or the study of clearance loss in storage devices. Further, in one or more embodiments, such techniques can also be used for characterizing microactuator induced responses and setting up a baseline of such responses during certification of a storage device.

Figure 2:
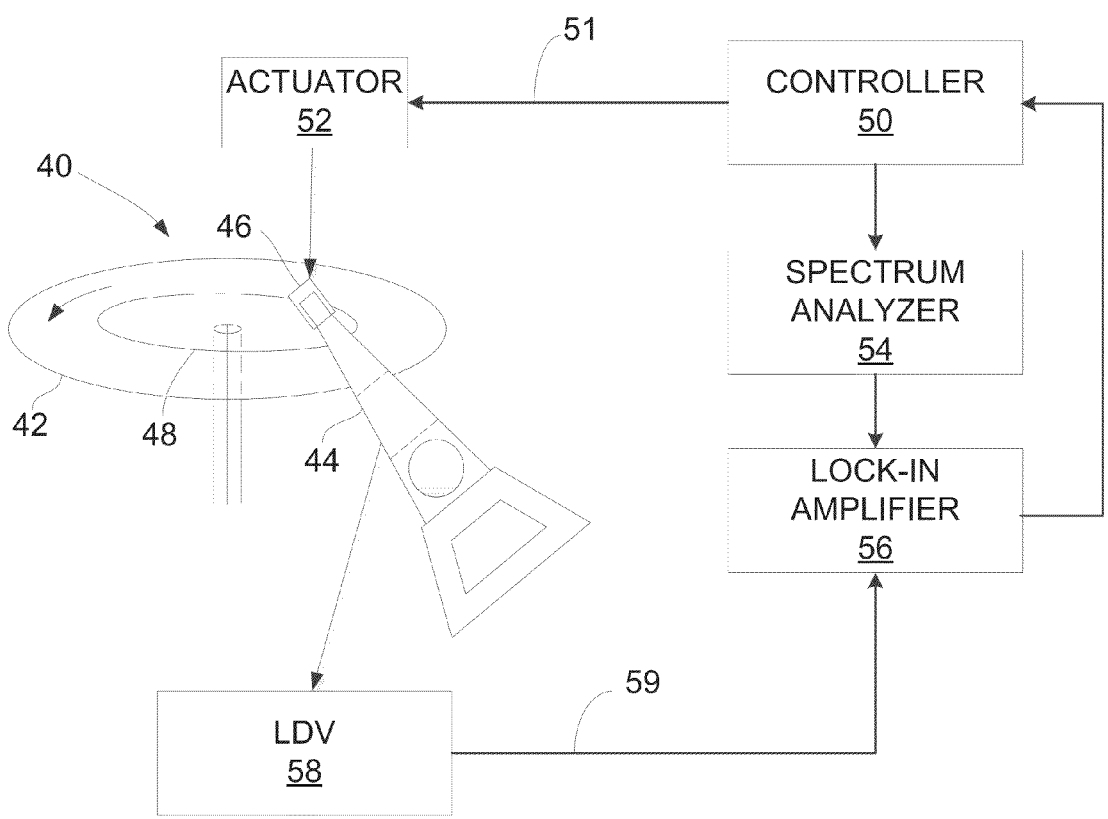
FIG. 2 is a schematic flow diagram of another embodiment of a storage device.

In general, any suitable system or apparatus can be utilized to detect the presence or absence of higher order resonance components or harmonic frequencies in response to microactuator input. For example, FIG. 2 is a schematic flow diagram of one embodiment of a storage device 40. All of the design considerations and possibilities regarding the storage device 10 of FIG. 1 apply equally to the storage device 40 of FIG. 2. Storage device 40 includes storage medium 42 and suspension 44 that supports head 46. The head 46 is configured to perform one or both of a read function and write function to track 48 of storage medium 42.

Storage device 40 also includes an actuator or microactuator 52 that is coupled to head 46. The actuator 52 is configured to actuate the head 46 of the storage device 40 and receive an input signal. The actuator 52 can include any suitable device or devices that can selectively position the head 46 relative to the storage medium 42 and the track 48. Further, any suitable device or devices can be included to provide an input signal 51 to actuator 52. In the embodiment illustrated in FIG. 2, controller 50 can be configured to provide the input signal 51 to actuator 52.

The input signal 51 can include any suitable signal. For example, in one or more embodiments, the input signal 51 includes a signal that is capable of modulating the actuator 52. This signal can include any suitable amplitude and any suitable frequency or frequencies. In one or more embodiments, the signal can include a frequency of greater than 1 kHz. In one or more embodiments, the signal can include a frequency of no greater than 500 kHz. The frequency signal can also include any suitable voltage or selected power provided to the actuator 52. In one or more embodiments, the input signal 51 can include a frequency pulse having any desired pulse length.

Further, in one or more embodiments, the input signal 51 can include any suitable number of frequencies. For example, in one or more embodiments, the input signal 51 may include a single tone frequency (e.g., during bode sweeps of the storage device 4, etc.). In one or more alternative embodiments, the input signal 51 may include a broadband input (e.g., during track following, buzz routines, etc.).

In one or more embodiments, a frequency of the input signal 51 can be selected to be any suitable value or known frequency. For example, a frequency of the input signal 51 can be selected to be substantially equal to a resonance frequency of the suspension 44. Any suitable technique or combination of techniques can be utilized to determine a resonance frequency of the suspension 44.

In one or more embodiments, the controller 50 is configured to identify a frequency or frequencies of the input signal 51. The controller 50 can include any suitable devices and circuitry that are operable to identify the frequency or frequencies of the input signal 51. For example, in one or more embodiments, the controller 50 can include a spectrum analyzer 54 that is configured to identify a frequency of the input signal 51. Any suitable spectrum analyzer 54 can be utilized. For example, in one or more embodiments, the spectrum analyzer 54 can include an on-chip spectrum analyzer. Such on-chip spectrum analyzers can include, e.g., MEMS-based devices, CMOS devices, etc.

In one or more embodiments, the controller 50 can also be configured to detect an output signal 59 in response to the input signal 51. Any suitable output signal or signals can be detected. For example, the output signal may include a measurement of vibrational motion of the suspension 44 of the storage device 40. In such embodiments, modulation of the head 46 by the actuator 52 may cause the suspension 44 to vibrate. In one or more embodiments, the output signal 59 can include a measurement of the vertical response of the suspension 44.

Any suitable devices and circuitry can be utilized to detect the output signal 59. For example, during certification, an LDV 58 can be coupled to the storage device 40 to provide output signal 59 that can be representative of the vibrational movement of the suspension 44.

In one or more embodiments, the controller 50 can also be configured to identify a frequency or frequencies of the output signal 59. Any suitable devices and circuitry can be utilized to identify the frequency or frequencies of the output signal 59, e.g., lock-in amplifier 56.

In one or more embodiments, lock-in amplifier 56 is configured to receive the frequency or frequencies identified in the input signal e.g., by the spectrum analyzer 54. The lock-in amplifier 56 can be configured to compare the output signal 59 to the frequency or frequencies of the input signal 51 provided by the spectrum analyzer 54 to the lock-in amplifier to identify one or more frequencies of the output signal 59.

The lock-in amplifier 56 can be configured to provide the frequency or frequencies of the output signal 59 to the controller 50. The controller 50, in one more embodiments, can be configured to compare an amplitude of a higher order frequency or frequencies of the output signal 59 to an amplitude of additional higher order frequencies of the output signal. The controller 50 can also be configured to determine whether the amplitude of a higher order frequency of the output signal 59 is greater than, equal to, or less than an amplitude of additional higher order frequencies. Any suitable devices or circuitry can be included in the controller 50 to compare amplitudes of two or more harmonic frequencies. For example, in one or more embodiments, the controller 50 can include a comparator that is configured to compare amplitudes of two or more harmonic frequencies. Based upon this comparison, the controller 50 can be configured to reconfigure the storage device 40 if the frequency of the output signal 59 includes certain higher order frequencies as described herein.

For example, the controller 50 can be configured to compare an amplitude of an even harmonic frequency (e.g., a second harmonic frequency) of the output signal 59 to an amplitude of an odd harmonic frequency (e.g., a third harmonic frequency) of the output signal. In one or more embodiments, even and odd harmonic frequencies (e.g., second and third harmonic frequencies) are present in the output signal 59, then the controller 50 is configured to reconfigure the storage device 40. The presence of both even and odd harmonic frequencies in the output signal 59 can, in some embodiments, indicate that the head 46 is positioned near storage medium 42 and contact between the head and storage medium may be imminent.

The controller 50 can reconfigure the storage device 40 in any suitable manner. For example, in one or more embodiments, a fly height between the head 46 and storage medium 42 can be increased to prevent contact between the head and storage medium. This fly height can be stored in memory (e.g., firmware logs) during certification of the storage device 40 and recalled during use of the storage device in the field as a threshold fly height during normal operation.

Figure 3:
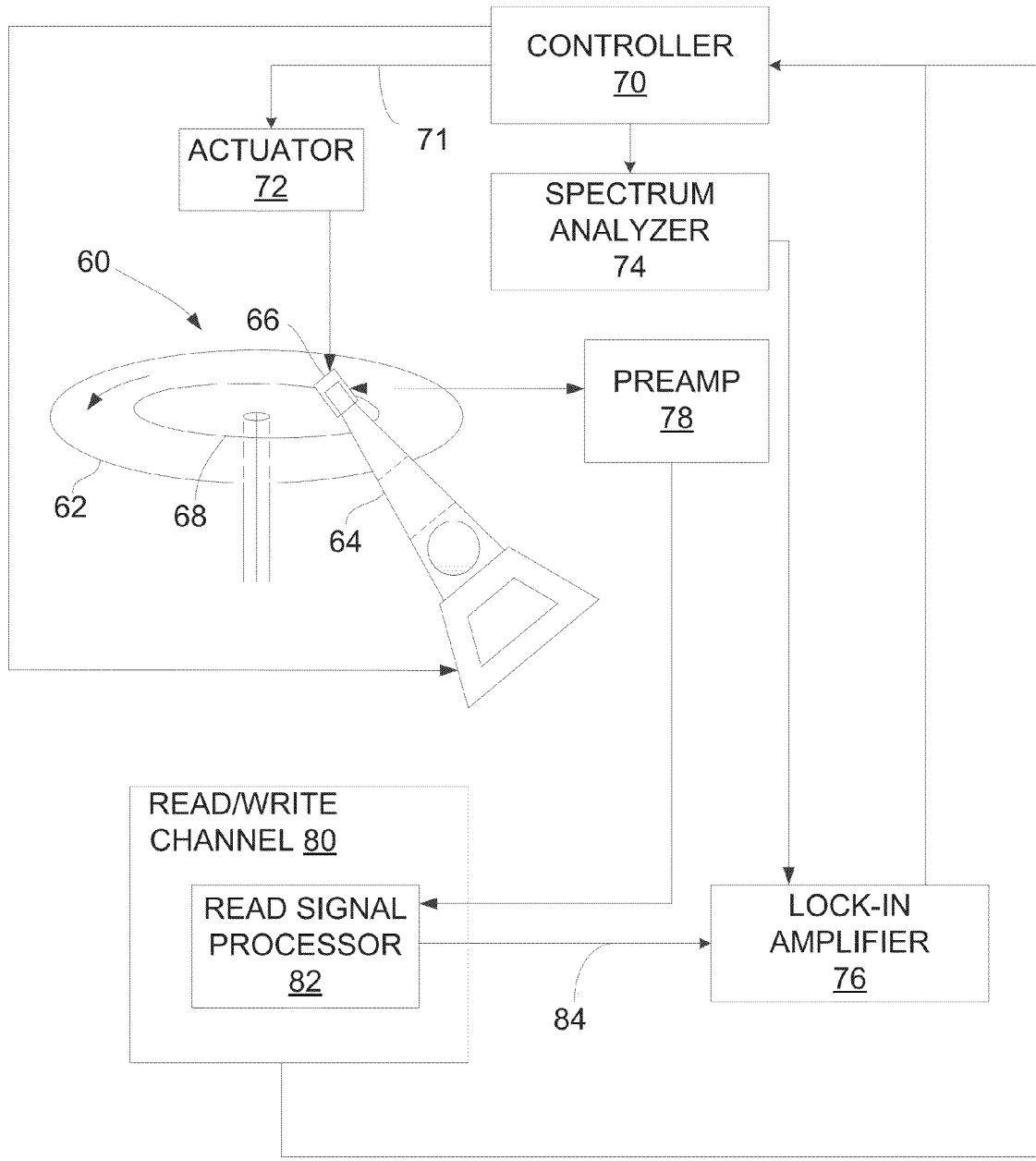
FIG. 3 is a schematic flow diagram of another embodiment of a storage device.

As mentioned herein, the described contact detection techniques can be utilized during certification of a storage device or with storage devices in use in the field, and the resulting data can be stored in memory (e.g., firmware logs) for recall (e.g., during field use of the device). For example, FIG. 3 is a schematic flow diagram of one embodiment of a storage device 60 that is configured to utilize the contact detection techniques described herein. All of the design considerations and possibilities regarding the storage devices 20 and 40 of FIGS. 1-2 apply equally to the storage device 60 of FIG. 3. One difference between storage device 60 of FIG. 3 and storage device 40 of FIG. 2 is that an output signal 84 is detected in response to an input signal 71 using information received from head 66 (e.g., DETCR or read-back signals) instead of measuring displacement of suspension 64.

Any suitable devices and circuitry can be utilized to obtain output signal 84. In one or more embodiments, controller 70 can include gain control circuitry that can be utilized to detect higher order harmonic frequencies of the output signal 84. Alternatively, in one or more embodiments, the output signal 84 can be detected from a read signal provided by the head 66 during a read function of data stored on storage medium 62 using any suitable technique or combination of techniques. In the embodiment illustrated in FIG. 3, read signal data is provided by preamp 78 to read/write channel 80. A read signal processor 82 can process the read signal data to provide the output signal 84 to lock-in amplifier 76. The lock-in amplifier 76 in turn provides the output signal to controller 70. The lock-in amplifier 76 can be configured to identify higher-order harmonic frequency components of the input signal 71 in the read signal data provided by read signal processor 82. The input signal 71 can be applied to actuator 72 of head 66 as is further described herein. In one or more alternative embodiments, the output signal 84 can include a position error signal as is further described herein.

The output signal 84 can be provided to the controller 70, which is configured to identify a frequency component of the output signal. Amplitudes of even and odd harmonic frequency (e.g., second and third harmonic frequencies) if present can be compared for identifying contact or the type of clearance loss between the head 66 and storage medium 62 as described herein.

Figure 4:
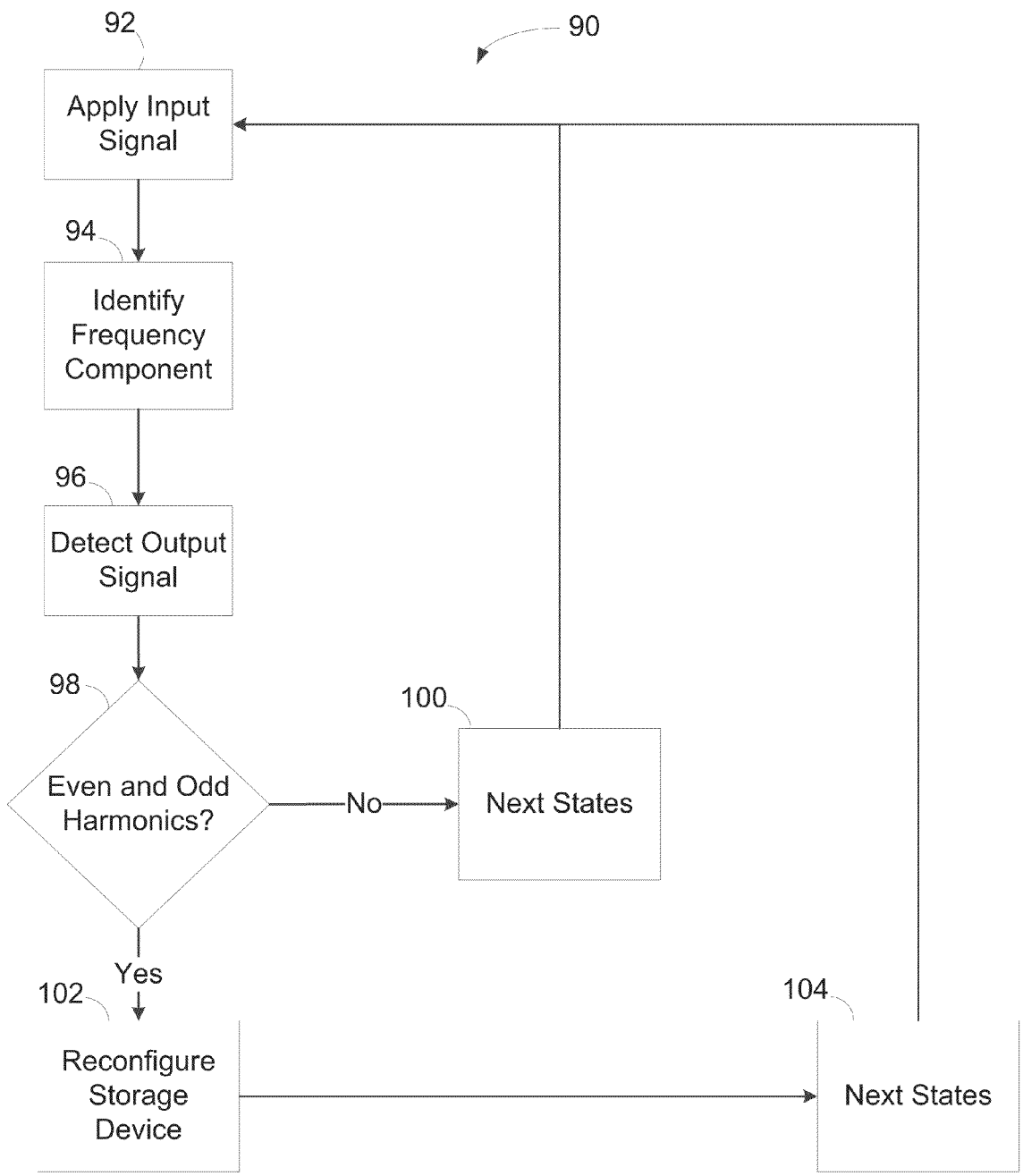
FIG. 4 is a schematic flow diagram of one embodiment of a method of detecting a contact event.

Any suitable technique or combination of techniques can be utilized with the storage devices described herein for detecting a contact between a head and storage medium of a storage device. For example, FIG. 4 is a schematic flow diagram of one embodiment of a method 90 of detecting a contact event. The method will be described in reference to storage device 60 of FIG. 3; although, method 90 can be utilized with any suitable storage device. The method 90 includes applying an input signal 92 to the actuator 72 of the head 66 of the storage device 60. Any suitable input signal 92 can be provided to the actuator 52 e.g., input signal 71. A frequency 94 of the input signal 92 can be identified using any suitable technique or combination of techniques. An output signal 96 responsive to the input signal 92 can be detected. A contact event 98 can be detected between the head 66 and the storage medium 62 of the storage device 60 if the output signal 96 includes even and odd harmonic frequencies, e.g., second and third harmonic frequencies. If such harmonic frequencies are not detected in the output signal 96, then the method 90 can proceed to any suitable next states 100. For example, the input signal 92 can be applied to the actuator 72, and testing of the input signal and output signal 96 can be repeated. Alternatively, in one or more embodiments, method 90 can proceed to a read function or a write function as is known in the art.

A contact event 98 between the head 66 and the storage medium 62 can be detected if the output signal 96 includes an even harmonic frequency and an odd harmonic frequency of the frequency of the input signal 92. If harmonic frequencies 98 are detected in the output signal 96, then the storage device 60 can be reconfigured 102. The storage device can be reconfigured in any suitable manner to prevent a contact event from occurring again, e.g., a fly height can be increased. Any suitable technique or combination of techniques can be utilized to reconfigure the storage device 60. Following reconfiguration of the storage device 60, the method 90 can proceed to any suitable next states 104. In one or more embodiments, such next states 104 can include applying input signal 92 to the actuator 72, and testing of the input signal and output signal 96 can be repeated.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The preceding detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. "Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method, comprising:
   applying an input signal to an actuator of a head of a storage device, wherein the head is supported by a suspension;
   identifying a frequency of the input signal;
   detecting an output signal from the head or the suspension in response to the input signal; and
   detecting a contact event between the head and a storage medium of the storage device if the output signal comprises an even harmonic frequency and an odd harmonic frequency of the frequency of the input signal.

2. The method of claim 1, further comprising reconfiguring the storage device if a contact event is detected.

3. The method of claim 1, wherein the input signal comprises a selected power level.

4. The method of claim 1, wherein the even harmonic frequency comprises a second harmonic frequency of the frequency of the input signal and the odd harmonic frequency comprises a third harmonic frequency of the frequency of the input signal.

5. The method of claim 1, wherein the input signal comprises a frequency pulse.

6. The method of claim 1, further comprising comparing an amplitude of the even harmonic frequency to an amplitude of the odd harmonic frequency.

7. The method of claim 1, further comprising measuring a resonance frequency of the suspension prior to applying the input signal to the actuator of the head of the storage device.

8. The method of claim 7, wherein the frequency of the input signal comprises the resonance frequency of the suspension.

9. The method of claim 1, wherein the output signal comprises a position error signal.

10. The method of claim 1, wherein the output signal comprises a read signal.

11. A storage device comprising:
    an actuator configured to actuate a head of the storage device and receive an input signal, wherein the head is supported by a suspension; and
    a controller configured to:
      identify a frequency of the input signal;
      detect an output signal from the head or the suspension in response to the input signal; and
      reconfigure the storage device if the output signal comprises an even harmonic frequency and an odd harmonic frequency of the frequency of the input signal.

12. The storage device of claim 11, wherein the controller comprises a lock-in amplifier configured to identify the presence of the even harmonic frequency and the odd harmonic frequency of the frequency of the input signal.

13. The storage device of claim 11, wherein the controller comprises a spectrum analyzer configured to identify the frequency of the input signal.

14. The storage device of claim 11, wherein the controller comprises gain control circuitry configured to detect the output signal in response to the input signal.

15. The storage device of claim 11, wherein the controller is further configured to compare an amplitude of the even harmonic frequency of the output signal to an amplitude of the odd harmonic frequency of the output signal.

16. The storage device of claim 15, wherein the controller further comprises a comparator configured to compare the amplitude of the even harmonic frequency and the amplitude of the odd harmonic frequency.

17. The storage device of claim 11, wherein the controller is further configured to reconfigure the storage device by increasing a fly height.

18. The storage device of claim 11, wherein the frequency of the input signal comprises the resonance frequency of the suspension.

19. The storage device of claim 11, wherein the output signal comprises a position error signal.

20. The storage device of claim 11, wherein the output signal comprises a read signal.

* * * * *